United States Patent Office 3,189,421
Patented June 15, 1965

3,189,421

BRAZED STRUCTURE

Arthur T. Cape, Monterey, Calif., assignor to Coast Metals, Inc., Little Ferry, N.J., a corporation of Delaware No Drawing. Filed Mar. 11, 1964, Ser. No. 351,196
3 Claims. (Cl. 29—196)

This application is a continuation-in-part of my co-pending application Serial No. 115,310, filed June 7, 1961, and now abandoned, which was a continuation-in-part of my application Serial No. 47,365, filed August 4, 1960, now abandoned, which was a continuation-in-part of my application Serial No. 812,123, filed May 11, 1959, now abandoned.

This invention relates, as indicated, to a brazed structure, but has reference to such a structure which consists essentially of austenitic stainless steel parts and a brazing alloy used in brazing or joining of these parts.

In U.S. Patents Nos. 2,743,177 and 2,755,183, nickel-base brazing alloys are described, which contain boron and silicon, and which are used for the brazing or joining of parts of austenitic stainless steels.

In making such nickel-base boron-silicon-containing alloys, it has been customary to use a nickel-boron alloy containing about 16.5% boron, since such a nickel-boron alloy can be incorporated in the melt without loss or oxidation of the boron. Elemental boron is not used in making such brazing alloys, due to the rapidity with which it becomes oxidized, and to the fact that its low density makes it difficult, under any circumstances, to dissolve in the metal bath. In order to provide a boron content of up to 5% in the brazing alloy, it was necessary to use nickel-boron in amounts of not more than 30% in the melt. However, prior to 1959, it was virtually impossible to obtain such a nickel-boron alloy which contained less than .5% carbon, so that in order to provide a boron content of 5% in the brazing alloy, the brazing alloy necessarily had a carbon content of .15%. As a result, the brazing alloy had a carbon content which was too high for use in brazing those austenitic stainless steels which contain less than 0.10% carbon.

The objection to the use of such brazing alloys for brazing such austenitic stainless steels resided in the fact that the carbon diffused from the brazing alloy into the metal parts which were being brazed. This diffusion of the carbon was, in many cases, exceedingly detrimental to the brazed parts, causing brittleness and other undesirable effects.

This diffusion effect is surprising because the carbon content of the brazing alloys does not have to be greater than that of the parts being brazed in order for this effect to take place. The diffusion effect, in such cases, is apparently due to the thermodynamic potential of the carbon in the system, which causes the demand of the parts being brazed, i.e., the base metal, for carbon, to exceed the ability of the brazing metal to retain its carbon. This so-called thermodynamic potential is, in other words, greater than the chemical potential of the carbon.

In order to completely eliminate this diffusion effect, I have found that the carbon content of the brazing alloy must be so low that even if all of the carbon were diffused out of the brazing alloy into the parts being brazed, there would still be no harmful accretion of carbon in the base metal.

I have found that carbon may be present in the brazing alloy in amounts of from 0.005 to 0.06%, and preferably in amounts of from 0.02 ot 0.03%, without causing detrimental effects in the brazed parts, even if all of the carbon in the brazing alloy is diffused into the brazed parts.

Attempts to prepare nickel-base brazing alloys of this type containing less than 0.005% carbon, are unsatisfactory because the brazing alloys will not flow, and will not be effective as brazing materials.

In 1958, for the first time, and by reason of an enormous amount of work done by applicant and his assignee company, Coast Metals, Inc., in preparing low carbon brazing materials, applicant was able to persuade a supplier to make and furnish a nickel-boron alloy containing 16.5% boron and only 0.15% carbon, or less than one-third as much as that previously present. A sufficient amount of this low carbon nickel-boron was obtained to be enabled to demonstrate that a critical minimum and maximum value existed for the carbon in the nickel-silicon-boron alloys.

The invention applies generally to any of the nickel-base boron-silicon containing brazing alloys for as long as boron is present in the brazing alloys there is a great tendency for the carbon to be thrown out of solution.

The brazing alloys which I consider as coming within the scope of my invention are, therefore, as follows:

| | Percent |
|---|---|
| Carbon | 0.005 to 0.06 |
| Boron | 0.025 to 5.25 |
| Silicon | 1 to 5.5 |
| Cobalt | 0 to 1.75 |
| Chromium | 0 to 20 |
| Iron | 0 to 5 |
| Nickel | Remainder |

The invention, as thus described, is particularly applicable to a brazed structure embodying those austenitic stainless steel parts which prior to brazing contain less than 0.10% carbon, and in which it is desired to avoid brittleness in the brazed structure resulting from the diffusion of carbon from the brazing alloy.

Austenitic stainless steels to which the invention is applicable include, for example, Nos. 304, 308, 309, 316, 321 and 347. The compositions of these austenitic stainless steels may be found on pages 409 and 467 of Metals Handbook, volume 1, Properties and Selection of Metals, published in 1961 by American Society for Metals, and are as follows:

| | 304 | 308 | 309 | 316 | 321 | 347 |
|---|---|---|---|---|---|---|
| Carbon max. | 0.03 | 0.08 | 0.08 | 0.08 | 0.08 | 0.08 |
| Manganese max. | 2 | 2 | 2 | 2 | 2 | 2 |
| Silicon max. | 1 | 1 | 1 | 1 | 1 | 1 |
| Chromium | 18-20 | 19-21 | 22-24 | 16-18 | 17-19 | 17-19 |
| Nickel | 8-12 | 10-12 | 12-15 | 10-14 | 9-12 | 9-13 |
| Molybdenum | | | | 2.5 | | |
| Iron | (1) | (1) | (1) | (1) | (1) | (1) |

1 Remainder.

It is recognized that in my French Patent No. 1,166,383, there is described a nickel-base brazing alloy which incidentally may contain from 0 to .5% carbon. This reference to carbon in the patent is purely incidental and has no reference to the actual invention disclosed in that patent. The type of brazing alloy referred to in that patent (in the absence of cobalt) was a "diffusing" type of alloy, which means that it diffuses, as a whole, into the base metal during a brazing operation, and the purpose of the invention was to avoid diffusion of the brazing alloy into the stainless steel parts which were being brazed, which diffusion caused the formation of stable austenite, causing stress due to the difference in coefficients of expansion between the transformed and untransformed material, resulting in a weak structure. This diffusion was reduced to a marked degree by incorporating cobalt, in amounts of 5% to 50%, in the nickel-base brazing alloy, the cobalt preventing the alloy from diffusing into the stainless steel parts and thereby preventing or minimizing the formation of austenite. In other words, the presence of cobalt, in substantial amount, is necessary in the alloy of the French patent, but is not necessary for the purposes of the present invention.

Moreover, in the disclosure of the aforesaid French patent, the stainless steels which were being brazed are of the semiaustenitic or precipitation-hardening type as apparent from the reference to 17–7 pH stainless steel, which type of stainless steel is excluded from the scope of the present invention. In the brazing of stainless steels of that type, it is essential that as little of the alloy as possible be transformed into austenite, due to the difference in coefficients of expansion between the transformed and untransformed material.

It is to be stressed that in dealing with austenitic stainless steels to which the present invention relates, the metallurgist is confronted with an entirely different problem than that which is involved in the aforesaid French patent. In brazing such steels with nickel-silicon-boron alloys, he is not concerned with avoiding austenitization of the brazed alloy but rather with avoidance of transfer of carbon from the brazing alloy to the brazed alloy in any amounts which can cause brittleness and other undesirable effects. This diffusion effect of carbon, for reasons already stated, was very surprising.

It is to be understood that various changes may be made in the brazed structure, as well as in the proportions of the brazing alloy without departing from the spirit of the invention, or the scope of the appended claims.

Having thus described my invention, I claim:

1. In the brazing of parts of austenitic stainless steels containing less than 0.10% carbon, the improvement which consists in brazing said parts with a brazing alloy consisting of 0.025 to 5.25% boron, 1 to 5.5% silicon, from 0.005 to 0.06% carbon, up to 1.75% cobalt, up to 20% chromium and up to 5% iron, and the balance substantially all nickel, whereby said parts contain not in excess of 0.06% of carbon derived from the brazing alloy as a result of the brazing.

2. A brazed structure comprising:

parts of austenitic stainless steel in which it is desired to avoid brittleness resulting from the diffusion of carbon thereinto from the brazing alloy used during brazing, said parts being of austenitic stainless steels containing less than 0.10% carbon prior to brazing and said parts containing not in excess of 0.06% carbon derived from the brazing alloy as a result of said brazing;

and a brazing alloy interposed between said parts and fused thereto securing them together, said brazing alloy consisting of 0.025 to 5.25% boron, 1 to 5.5% silicon, and from 0.005 to 0.06% carbon and the remainder of the alloy being substantially all nickel.

3. A brazed structure consisting of parts of austenitic stainless steel in which it is desired to avoid brittleness resulting from the diffusion of carbon thereinto from the brazing alloy used during brazing, said parts being of austenitic stainless steels containing less than 0.10% carbon prior to brazing and a brazing alloy interposed between said parts and fused thereto securing them together, said brazing alloy consisting of 0.025 to 5.25% of boron, 1 to 5.5% silicon, up to 1.75% cobalt, up to 20% chromium, up to 5% iron, from 0.005 to 0.06% carbon, and the remainder of the alloy being substantially all nickel whereby said parts contain not in excess of 0.06% carbon derived from the brazing alloy as a result of said brazing.

References Cited by the Examiner

UNITED STATES PATENTS 2,249,723 7/41 Orr ---------------- 29—504 X
2,743,177 4/56 Cape ---------------- 75—170 X

FOREIGN PATENTS 803,253 10/58 Great Britain.

OTHER REFERENCES

Metal Handbook, vol. 1, 8th Edition, page 3, 408–410.
Monypenny, vol. 1, 3rd Edition, published by Chapman & Hall, Limited, 37 Essex St., WC2 London, page 57.

DAVID L. RECK, *Primary Examiner.*

HYLAND BIZOT, *Examiner.*